United States Patent
Sugawara et al.

(10) Patent No.: US 10,761,329 B2
(45) Date of Patent: Sep. 1, 2020

(54) IMAGE PROJECTION DEVICE

(71) Applicant: QD LASER, INC., Kawasaki-shi (JP)

(72) Inventors: Mitsuru Sugawara, Kawasaki (JP); Makoto Suzuki, Kawasaki (JP); Michio Arai, Kawasaki (JP)

(73) Assignee: QD LASER, INC., Kawasaki-shi (JP)

( * ) Notice: Subject to any disclaimer, the term of this patent is extended or adjusted under 35 U.S.C. 154(b) by 50 days.

(21) Appl. No.: 16/062,424

(22) PCT Filed: Nov. 28, 2016

(86) PCT No.: PCT/JP2016/085255
§ 371 (c)(1),
(2) Date: Jun. 14, 2018

(87) PCT Pub. No.: WO2017/119213
PCT Pub. Date: Jul. 13, 2017

(65) Prior Publication Data
US 2018/0373041 A1  Dec. 27, 2018

(30) Foreign Application Priority Data

Jan. 5, 2016  (JP) .................................. 2016-000622

(51) Int. Cl.
*G02B 27/01* (2006.01)
*G02B 27/02* (2006.01)
(Continued)

(52) U.S. Cl.
CPC ......... *G02B 27/0172* (2013.01); *G02B 26/10* (2013.01); *G02B 27/02* (2013.01);
(Continued)

(58) Field of Classification Search
CPC .............. G03B 21/206; G03B 21/2066; G02B 27/0172; G02B 26/10; G06F 3/013
See application file for complete search history.

(56) References Cited

U.S. PATENT DOCUMENTS 5,517,021 A * 5/1996 Kaufman ............... A61B 3/113
250/221
5,717,413 A  2/1998 Mizouchi
(Continued)

FOREIGN PATENT DOCUMENTS

JP  H07-261728 A  10/1995
JP  H08-22385 A  1/1996
(Continued)

OTHER PUBLICATIONS

Office Action for corresponding Japanese Patent Application No. 2016-000622 dated Aug. 1, 2017 (3 Sheets, 3 Sheets translation, 6 Sheets total).
(Continued)

*Primary Examiner* — Amare Mengistu
*Assistant Examiner* — Crystal Mathews
(74) *Attorney, Agent, or Firm* — Kratz, Quintos & Hanson, LLP

(57) ABSTRACT

An image projection device includes: a projection unit that projects an image light beam forming an image onto a pupil of an eyeball of a user to project the image onto a retina of the eyeball; a detection unit that detects a direction in which the pupil has moved relative to a face of the user and a speed of movement of the pupil; and a control unit that performs different controls of the image when the pupil has moved at different speeds in a same direction.

14 Claims, 17 Drawing Sheets

(51) Int. Cl.
  *G09G 3/00* (2006.01)
  *G09G 5/38* (2006.01)
  *G02B 26/10* (2006.01)
  *G03B 21/20* (2006.01)
  *G06F 3/01* (2006.01)
  *G09G 3/34* (2006.01)

(52) U.S. Cl.
  CPC ....... *G03B 21/206* (2013.01); *G03B 21/2066* (2013.01); *G06F 3/013* (2013.01); *G09G 3/002* (2013.01); *G09G 5/38* (2013.01); *G09G 3/346* (2013.01)

(56) References Cited

U.S. PATENT DOCUMENTS

| | | | | |
|---|---|---|---|---|
| 5,848,175 | A * | 12/1998 | Akashi | G03B 13/02 382/115 |
| 6,227,667 | B1 * | 5/2001 | Halldorsson | G02B 27/017 351/206 |
| 6,382,796 | B1 * | 5/2002 | Ban | A61B 3/107 351/212 |
| 6,659,611 | B2 * | 12/2003 | Amir | A61B 3/113 351/210 |
| 7,561,143 | B1 * | 7/2009 | Milekic | G06F 3/013 345/156 |
| 2005/0278004 | A1 * | 12/2005 | Steinert | A61B 3/113 607/89 |
| 2006/0192094 | A1 * | 8/2006 | Taniguchi | G02B 5/00 250/235 |
| 2006/0239670 | A1 * | 10/2006 | Cleveland | A61B 3/113 396/51 |
| 2007/0159599 | A1 * | 7/2007 | Yamada | A61B 3/113 351/211 |
| 2008/0151185 | A1 * | 6/2008 | Saito | A61B 3/12 351/206 |
| 2010/0060551 | A1 * | 3/2010 | Sugiyama | G02B 26/06 345/8 |
| 2010/0097580 | A1 * | 4/2010 | Yamamoto | G02B 26/101 353/69 |
| 2010/0149073 | A1 * | 6/2010 | Chaum | G02B 27/0093 345/8 |
| 2013/0027302 | A1 | 1/2013 | Iwaizumi | |
| 2013/0114043 | A1 * | 5/2013 | Balan | G02B 27/017 351/210 |
| 2014/0138544 | A1 * | 5/2014 | Sprague | G06F 3/013 250/341.8 |
| 2014/0139404 | A1 * | 5/2014 | Takeda | G02B 27/0172 345/8 |
| 2014/0164756 | A1 * | 6/2014 | Huang | G06F 3/013 713/100 |
| 2014/0232639 | A1 | 8/2014 | Hayashi | |
| 2015/0084864 | A1 * | 3/2015 | Geiss | G06F 3/013 345/158 |
| 2015/0146028 | A1 * | 5/2015 | Choi | H04N 5/23219 348/211.11 |
| 2015/0161472 | A1 * | 6/2015 | Yoshioka | G06K 9/52 382/197 |
| 2015/0205494 | A1 | 7/2015 | Scott | |
| 2016/0085302 | A1 * | 3/2016 | Publicover | G06F 21/64 345/633 |
| 2016/0103324 | A1 | 4/2016 | Arakawa | |
| 2016/0196465 | A1 * | 7/2016 | Wu | G06K 9/0061 382/203 |
| 2016/0209657 | A1 * | 7/2016 | Popovich | G02B 27/017 |
| 2016/0270655 | A1 * | 9/2016 | Caraffi | A61B 3/113 |
| 2017/0072305 | A1 * | 3/2017 | Watanabe | A63F 13/26 |
| 2018/0113303 | A1 * | 4/2018 | Popovich | G02B 27/0093 |
| 2018/0373024 | A1 * | 12/2018 | Sugawara | G02B 26/10 |

FOREIGN PATENT DOCUMENTS

| | | |
|---|---|---|
| JP | H11-338457 A | 12/1999 |
| JP | 2000-020534 A | 1/2000 |
| JP | 2004-252849 A | 9/2004 |
| JP | 2010-152443 A | 7/2010 |
| JP | 2012-137639 A | 7/2012 |
| JP | 2013-025656 A | 2/2013 |
| JP | 2014-157466 A | 8/2014 |
| WO | 2014/192479 A1 | 12/2014 |

OTHER PUBLICATIONS

International Search Report for International Application No. PCT/JP2016/085255 dated Feb. 21, 2017 (2 Sheets).

* cited by examiner

FIG. 14

| DETECTION LIGHT BEAM | MOVE DIRECTION | MOVE AMOUNT |
|---|---|---|
| A | AA | aa |
| B | BB | bb |
| ⋮ | ⋮ | ⋮ |

IMAGE PROJECTION DEVICE

TECHNICAL FIELD

The present invention relates to an image projection device.

BACKGROUND ART

There have been known image projection devices such as head-mounted displays (HMDs) that directly project an image onto the retina of the user by using a light beam emitted from a light source (for example, Patent Document 1). Such image projection devices employ a method called Maxwellian view. In Maxwellian view, the light beam forming an image is made to be converged on the vicinity of the pupil to project the image onto the retina.

There has been also known an image projection device that scrolls an image or turns a page in accordance with the direction of movement of the eyeball of the user and recognizes the movement speed of the eyeball of the user to determine the scrolling increment in accordance with the recognized speed (for example, Patent Document 2). There has been also known an image projection device that relates the speed of the visual line during saccadic movement of the eye of the user to the degree of asthenopia, and changes a warning message depending on the degree of asthenopia (for example, Patent Document 3).

PRIOR ART DOCUMENT

Patent Document

Patent Document 1: International Publication No. 2014/192479
Patent Document 2: Japanese Patent Application Publication No. 2010-152443
Patent Document 3: Japanese Patent Application Publication No. 2012-137639

SUMMARY OF THE INVENTION

Problem to be Solved by the Invention

However, merely controlling the image in accordance with the direction of movement of the eyeball of the user leaves room for improvement in performing different controls of the image.

The present invention has been made in view of the above problems, and aims to provide an image projection device capable of performing different controls of an image.

Means for Solving the Problem

The present invention is an image projection device characterized by including: a projection unit that projects an image light beam forming an image onto a pupil of an eyeball of a user to project the image onto a retina of the eyeball; a detection unit that detects a direction in which the pupil has moved relative to a face of the user and a speed of movement of the pupil; and a control unit that performs different controls of the image when the pupil has moved at different speeds in a same direction.

In the above configuration, the control unit may be configured to perform a first control of the image when it is determined that the speed of movement of the pupil is less than a predetermined speed, and performs a second control of the image when the speed of movement of the pupil is the predetermined speed or greater.

In the above configuration, the controls of the image may be configured to include at least one of a control relating to a projection position of the image and a control relating to a content of the image.

In the above configuration, the control unit may be configured to perform a control relating to a projection position of the image when the speed of movement of the pupil is less than a predetermined speed, and performs a control relating to a content of the image when the speed of movement of the pupil is the predetermined speed or greater.

In the above configuration, the image projected onto the retina may be configured to include a first image and a second image different from the first image, and the control unit may be configured to move a projection position of the image light beam so that the first image being projected on the retina continues to be projected when the speed of movement of the pupil is less than the predetermined speed, and changes the first image being projected on the retina to the second image when the speed of movement of the pupil is the predetermined speed or greater.

In the above configuration, the image projected onto the retina may be configured to be an image corresponding to a page of a digital book, and the control unit may be configured to turn the page of the digital book when a speed of movement of the pupil in a right-and-left direction is the predetermined speed or greater.

In the above configuration, the image projected onto the retina may be configured to be an image including a plurality of icons, and the control unit may be configured to select from the plurality of icons an icon corresponding to the direction in which the pupil has moved and the speed of movement of the pupil.

In the above configuration, the control unit may be configured to perform different controls of the image when the pupil has moved in different directions.

In the above configuration, a light detector that detects reflected lights of detection light beams that are projected onto the iris of the eyeball while being aligned in a radial direction of the pupil may be provided, and the detection unit may be configured to detect the direction in which the pupil has moved and the speed of movement of the pupil based on detection results of the reflected lights of the detection light beams by the light detector.

The present invention is an image projection device characterized by including: a projection unit that projects an image light beam forming an image onto a pupil of an eyeball of a user to project the image onto a retina of the eyeball; a light detector that detects reflected lights of detection light beams that are projected onto an iris of the eyeball while being aligned in a radial direction of the pupil; a detection unit that detects a direction in which the pupil has moved and a speed of movement of the pupil based on detection results of reflected lights of the detection light beams by the light detector; and a control unit that performs different controls of the image based on a detected direction in which the pupil has moved and a detected speed of movement of the pupil.

In the above configuration, the detection light beams may be configured to be projected onto the iris in a form of concentric circles with respect to the pupil.

In the above configuration, the detection light beams and the image light beam may be configured to be emitted from a single light source.

Effects of the Invention

The present invention allows different controls of an image to be performed.

BRIEF DESCRIPTION OF THE DRAWINGS

FIG. 14 is a table that the control unit has in the second embodiment;

EMBODIMENTS FOR CARRYING OUT THE INVENTION

Hereinafter, with reference to the accompanying drawings, embodiments of the present invention will be described.

First Embodiment

Figure 1:
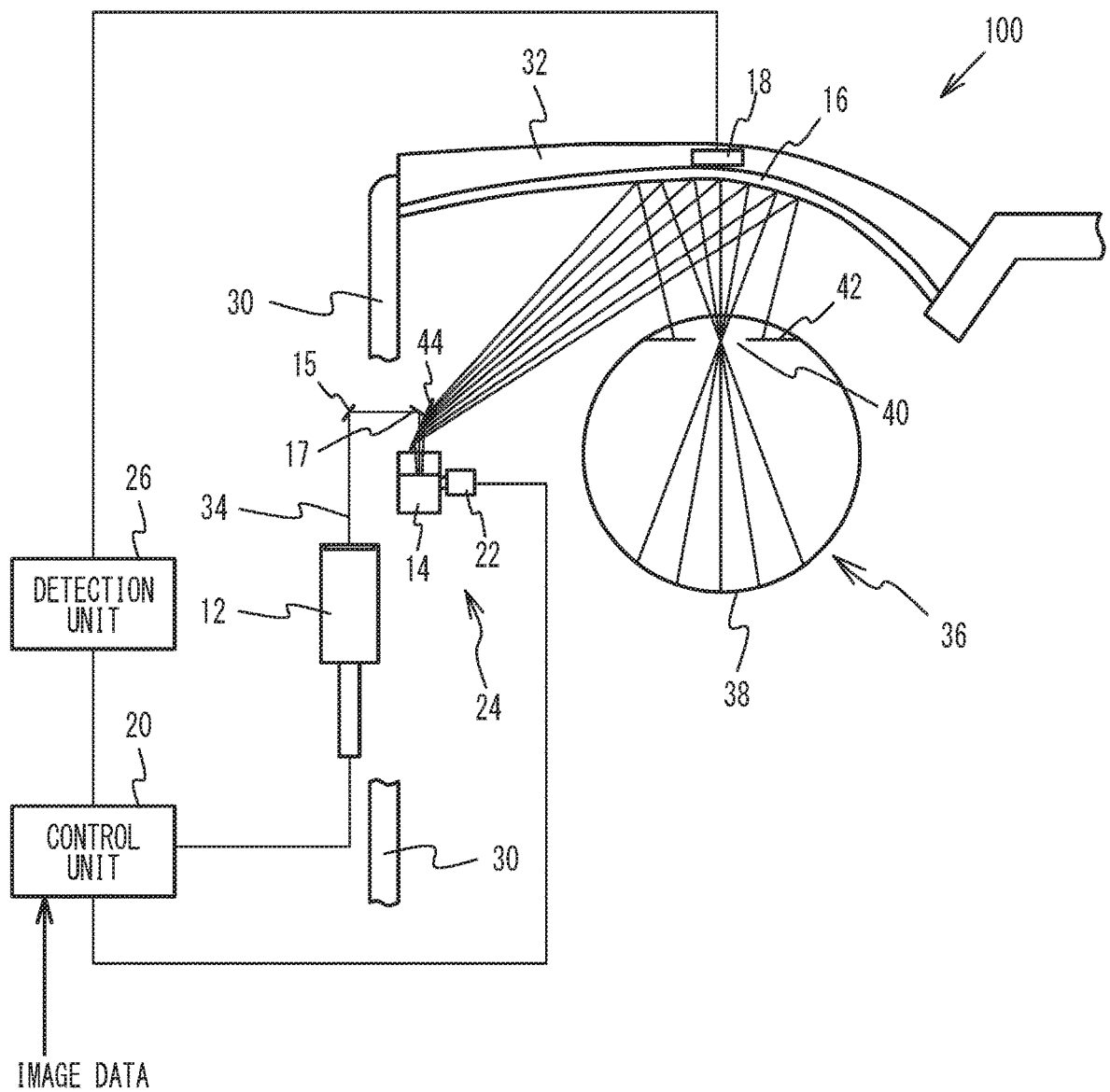
FIG. 1 illustrates an image projection device in accordance with a first embodiment as viewed from above.
Figure 2:
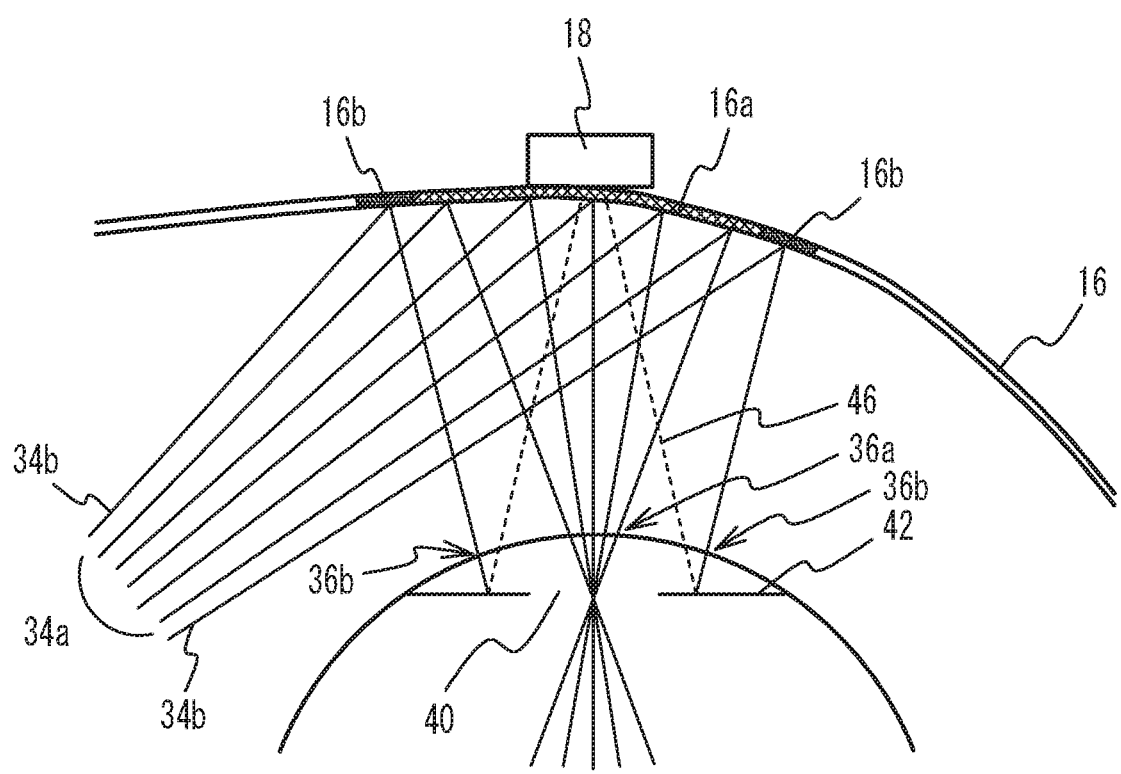
FIG. 2 is an enlarged view of the vicinity of a projection portion in FIG. 1.

FIG. 1 illustrates an image projection device in accordance with a first embodiment as viewed from above. FIG. 2 is an enlarged view of the vicinity of a projection portion in FIG. 1. The image projection device of the first embodiment is a retina projection type head-mounted display that employs Maxwellian view in which an image light beam for causing the user to visually recognize an image is directly projected onto the retina of the eyeball of the user.

An image projection device 100 of the first embodiment includes a light detector 18, a control unit 20, a projection unit 24, and a detection unit 26 as illustrated in FIG. 1. The projection unit 24 includes a light source 12, a first mirror 14, a second mirror 15, a third mirror 17, a fourth mirror 44, a projection portion 16, and a position adjustment unit 22. The light source 12 is arranged in a temple 30 of a spectacle type frame. The light source 12 emits, for example, a light beam 34 of a single wavelength or a plurality of wavelengths under the instruction of the control unit 20. The light beam 34 includes an image light beam for projecting an image onto a retina 38 of an eyeball 36 of the user and a detection light beam for detecting the movement of a pupil 40 of the eyeball 36 of the user and opening and closing of the eyelid of the user. Since the detection light beam is emitted from the light source 12 from which the image light beam is also emitted, the detection light beam is a visible light as well as the image light beam. The light source 12 emits, for example, a red laser light (wavelength: approximately 610 nm to 660 nm), a green laser light (wavelength: approximately 515 nm to 540 nm), and a blue laser light (wavelength: 440 nm to 480 nm). Non-limiting examples of the light source 12 emitting red, green, and blue laser lights include a light source in which respective laser diode chips of RGB (red/green/blue), a three-color synthesis device, and a micro collimating lens are integrated.

The first mirror 14 is arranged in the temple 30 of the spectacle type frame. The first mirror 14 scans the image light beam emitted from the light source 12 in the horizontal direction and the vertical direction. Additionally, the first mirror 14 reflects the detection light beam emitted from the light source 12. The first mirror 14 is, for example, a MEMS (Micro Electro Mechanical System) mirror. The light beam 34 emitted from the light source 12 is reflected by, for example, the second mirror 15 and the third mirror 17 to enter the first mirror 14.

Figure 3A:
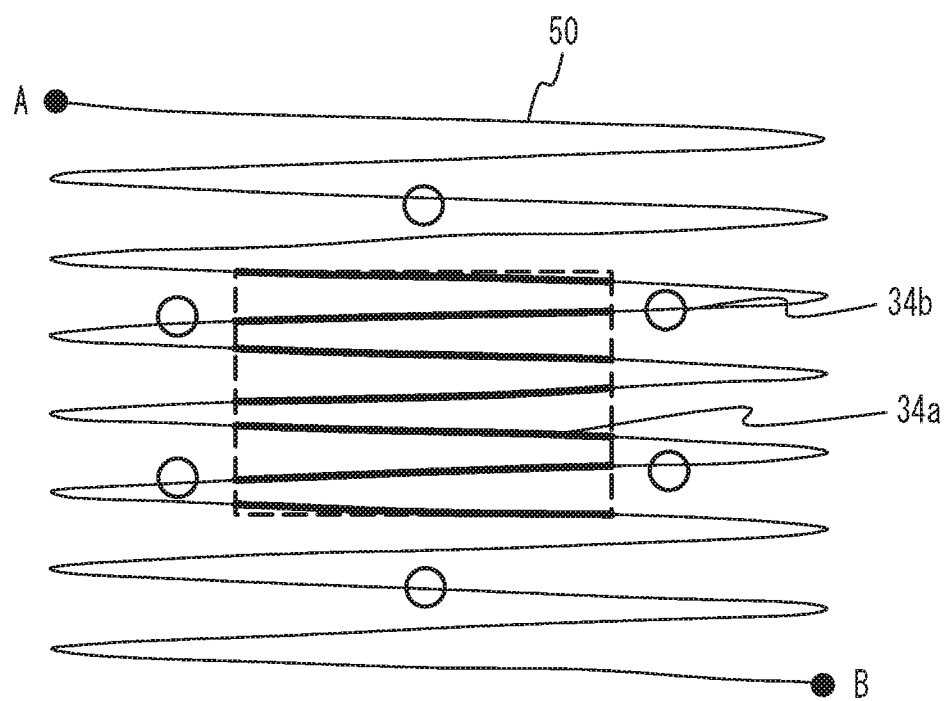
FIG. 3A illustrates oscillation of a first mirror.

FIG. 3A illustrates oscillation of the first mirror. The image light beam and the detection light beam will be described with FIG. 3A and FIG. 3B described later. For clarity of the description, in FIG. 3A and FIG. 3B, the number of detection light beams is reduced. One of the methods for projecting an image onto the retina 38 by scanning the image light beam by the first mirror 14 is a method that displays an image by scanning a light at high speed from the upper left to the lower light of the image (for example, raster scan). As illustrated in FIG. 3A, the first mirror 14 oscillates in the horizontal direction (a first direction) and the vertical direction (a second direction intersecting with the first direction) beyond the area of the image projected onto the retina 38 (the area indicated by a dashed line in FIG. 3A) to scan an image light beam 34a. The oscillation of the first mirror 14 is indicated by reference numeral 50.

When an image is projected onto the retina 38 by scanning the image light beam 34a at the points at which the first mirror 14 swings greatly, image distortion is large. Thus, the image light beam 34a is scanned at the points at which the swing of the first mirror 14 is small. On the other hand, a detection light beam 34b enters the first mirror 14 at the timings when the image light beam 34a is not scanned in the oscillation 50 of the first mirror 14. In other words, in the oscillation 50 of the first mirror 14, the light source 12 emits the image light beam 34a to the first mirror 14 in the period corresponding to the area of the image projected onto the retina 38 and emits the detection light beam 34b to the first mirror 14 at time corresponding to the outside of the area of the image.

Figure 3B:
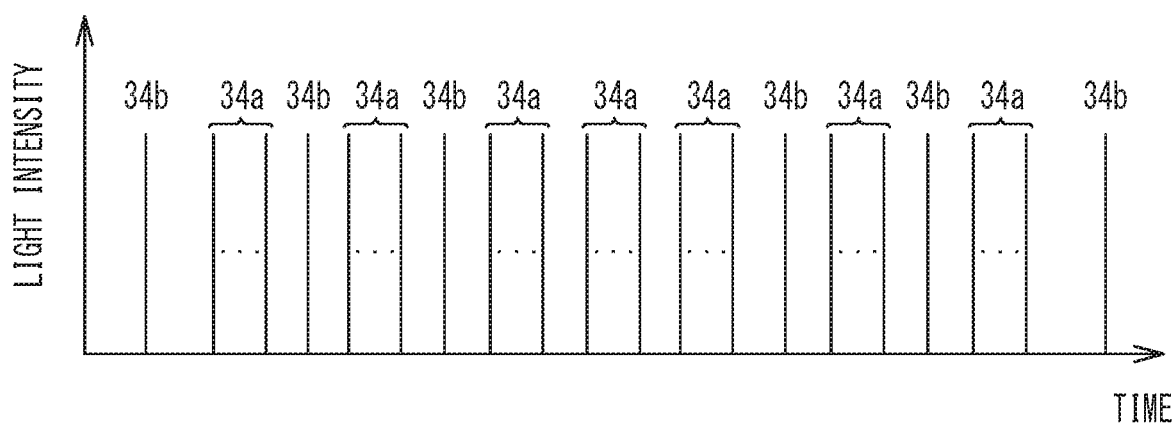
FIG. 3B is a timing chart illustrating emission timings of an image light beam and a detection light beam.

FIG. 3B is a timing chart illustrating emission timings of the image light beam and the detection light beam, and illustrates the emission timings of the image light beam 34a and the detection light beam 34b from the light source 12 when the first mirror 14 oscillates from a point A to a point B in FIG. 3A. The light intensity of the detection light beam 34b may be the same as or different from that of the image light beam 34a. The light intensity of the detection light beam 34b may be any light intensity that allows a reflected light 46 to be detected by the light detector 18. It is sufficient if the detection light beam 34b is a light beam of a single wavelength and is a light beam corresponding to one pixel or several pixels of the image projected onto the retina 38. FIG. 3A illustrates a case where the image light beam 34a is scanned in a rectangular shape as an example, but does not intend to suggest any limitation. The image light beam 34a may be scanned in other shapes such as a trapezoidal shape.

As illustrated in FIG. 1 and FIG. 2, the image light beam 34a scanned by the first mirror 14 and the detection light beam 34b reflected by the first mirror 14 are reflected by the fourth mirror 44 toward a lens 32 of the spectacle type frame. Since the projection portion 16 is arranged on the surface closer to the eyeball 36 of the lens 32, the image light beam 34a scanned by the first mirror 14 and the detection light beam 34b reflected by the first mirror 14 enter the projection portion 16. The projection portion 16 is a half mirror that has a free curved surface or a composite structure of a free curved surface and a diffraction surface in a first region 16a where the image light beam 34a is incident. This structure causes the image light beam 34a that has entered the projection portion 16 to converge on the vicinity of the pupil 40 of the eyeball 36 and then be projected onto the retina 38. Accordingly, the user is able to recognize the image formed by the image light beam 34a and visually recognize an external world image through the projection portion 16. On the other hand, the projection portion 16 is a half mirror that has a shape optically discontinuous with the first region 16a in second regions 16b where the detection light beam 34b is incident. Accordingly, the detection light beam 34b is projected onto an iris 42 of the eyeball 36 when the image light beam 34a passes through the pupil 40 and is then projected onto the retina 38. As described above, when the surface region of the eyeball 36 onto which the image light beam 34a is projected is defined as a first surface region 36a, the detection light beam 34b is projected onto second surface regions 36b distant from the first surface region 36a of the eyeball 36.

Figure 4:
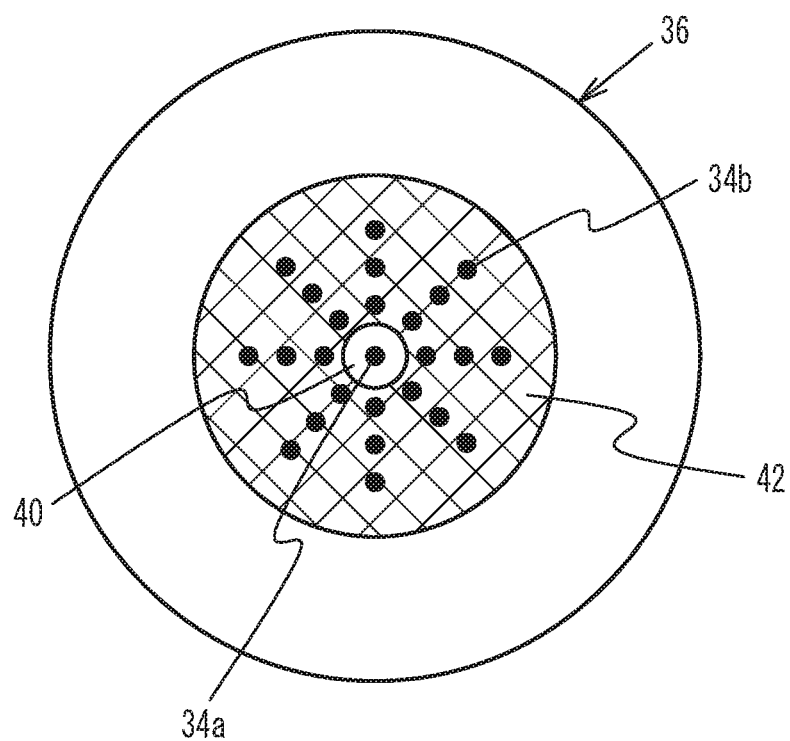
FIG. 4 is a front view of an eyeball illustrating the irradiation positions of the detection light beams.

FIG. 4 is a front view of an eyeball illustrating the irradiation positions of the detection light beams. The projection of the image light beam 34a and the detection light beam 34b onto the eyeball 36 will be described with FIG. 4. As illustrated in FIG. 4, the detection light beams 34b are projected onto the iris 42 when the image light beam 34a passes through the vicinity of the center of the pupil 40 and is then projected onto the retina 38. The detection light beams 34b are scattered in the form of concentric circles with respect to the pupil 40, and projected onto the iris 42 while being aligned in the radial direction of the pupil 40. Since the second regions 16b of the projection portion 16 are optically discontinuous with the first region 16a, the detection light beams 34b can be projected onto the iris 42 while the image light beam 34a passes through the pupil 40 and is projected onto the retina 38. The image light beam 34a and the detection light beams 34b are emitted from the light source 12 at predetermined timings with respect to the oscillation of the first mirror 14. That is, the relative emission timings of the image light beam 34a and the detection light beams 34b are fixed. Thus, the image light beam 34a and the detection light beams 34b are projected onto the eyeball 36 while the relative positional relation between the image light beam 34a and the detection light beams 34b is fixed. Additionally, as illustrated in FIG. 3A, since the detection light beams 34b are lights reflected at different positions of the oscillation 50 of the first mirror 14, the detection light beams 34b are projected onto different positions of the iris 42 at different times (different timings). That is, the detection light beams 34b are sequentially projected onto different positions of the iris 42.

Figure 5:
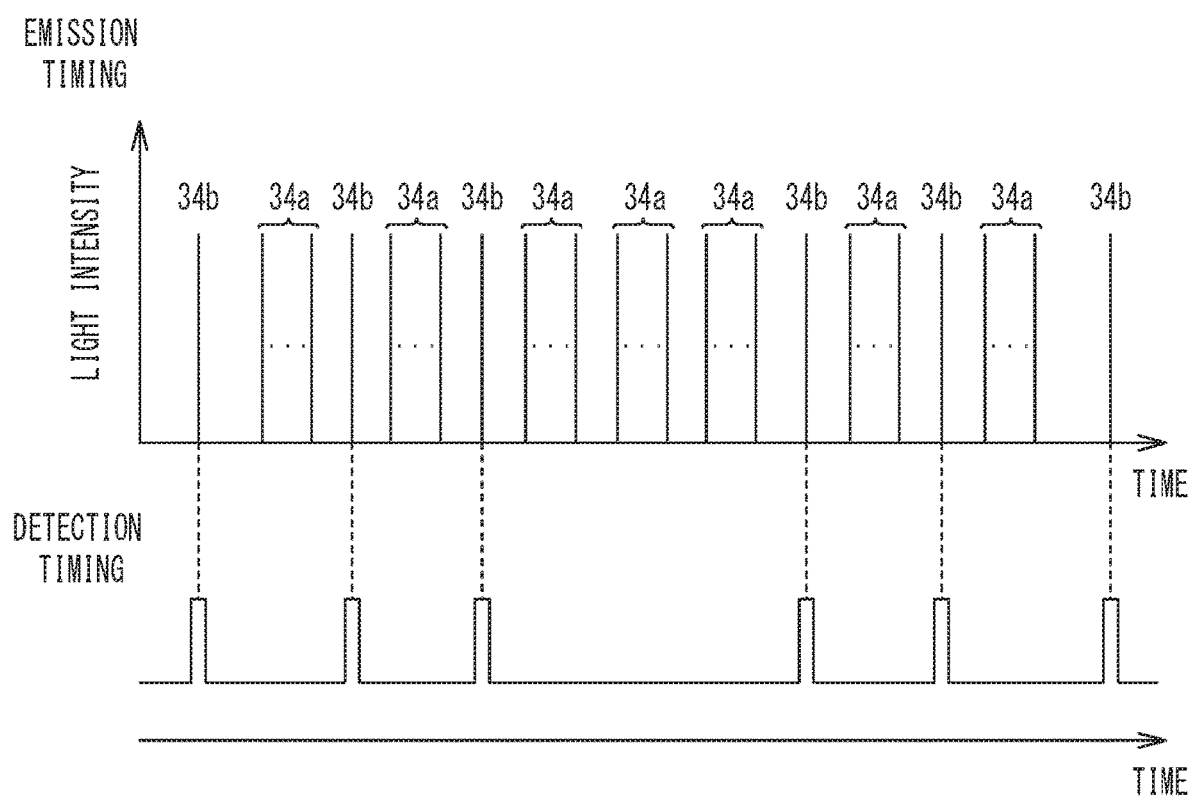
FIG. 5 is a timing chart illustrating detection timings at which a reflected light is detected.

As illustrated in FIG. 1 and FIG. 2, the light detector 18 is arranged in the frame of the lens 32. The light detector 18 is, for example a photodetector. The light detector 18 detects the reflected lights 46 that are the detection light beams 34b reflected by the iris 42. FIG. 5 is a timing chart illustrating detection timings at which the reflected light is detected. The detection timings at which the control unit 20 detects the reflected light 46 using the light detector 18 will be described with FIG. 5. In FIG. 5, for clarity of the description, the number of the detection light beams is reduced. As illustrated in FIG. 5, the control unit 20 detects the reflected light 46 by using the light detector 18 at the timing when causing the light source 12 to emit the detection light beam 34b. This operation enables to know which of the reflected lights 46 of the detection light beams 34b is not detected. Ranges may be given to the time during which the reflected light 46 is detected taking into consideration the performance of the light detector 18.

FIG. 1 and FIG. 2 illustrate a case where the light detector 18 is arranged near the center of the lens 32 as an example, but the light detector 18 may be arranged, for example, near the temple 30 of the lens 32 or the nose pads (not illustrated) as long as it can detect the reflected light 46. Even when the detection light beams 34b are projected onto the iris 42, since the detection light beams 34b are sequentially projected onto the iris 42 as described above, the detection of the reflected lights 46 of the detection light beams 34b by the single light detector 18 is possible.

A processor such as a CPU (Central Processing Unit) and memories such as a RAM (Random Access Memory) and a ROM (Read Only Memory) function as the control unit 20 and the detection unit 26. The processor and the memories are provided to an external device (e.g., a mobile terminal). The processor functions as the control unit 20 and the detection unit 26 in accordance with the programs stored in the memory. The control unit 20 and the detection unit 26 may be implemented by different processors or the same processor.

The control unit 20 controls the projection unit 24. The control unit 20 causes the light source 12 to emit the image light beam 34a based on input image data and the detection light beam 34b for detecting the movement of the pupil 40 and opening and closing of the eyelid. Additionally, the control unit 20 controls an optical system including the light source 12, the first mirror 14, and the like based on the detection result by the detection unit 26. For example, the control unit 20 controls the emission of the light beam including the image light beam 34a and/or the detection light beam 34b from the light source 12. For example, the control unit 20 drives the position adjustment unit 22 to perform a control to move the position of the first mirror 14 and move the positions of the third mirror 17 and the fourth mirror 44 in conjunction with the move of the first mirror 14.

Figure 6A:
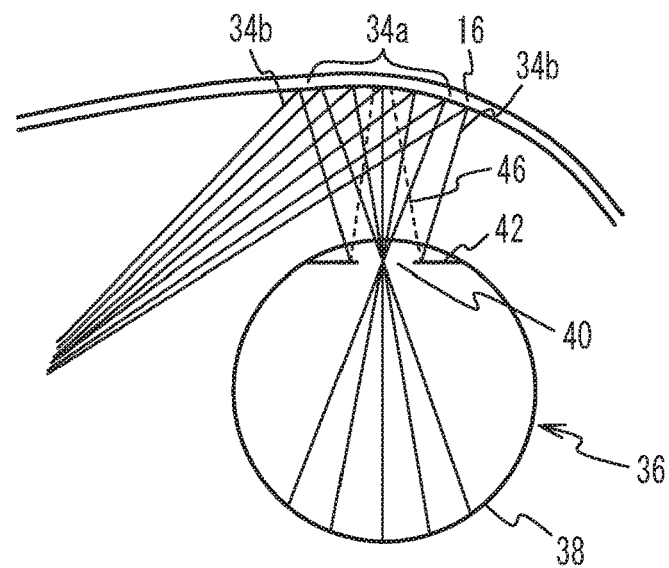
FIG. 6A through FIG. 6C illustrate the projection portion and an eyeball as viewed from above.
Figure 6B:
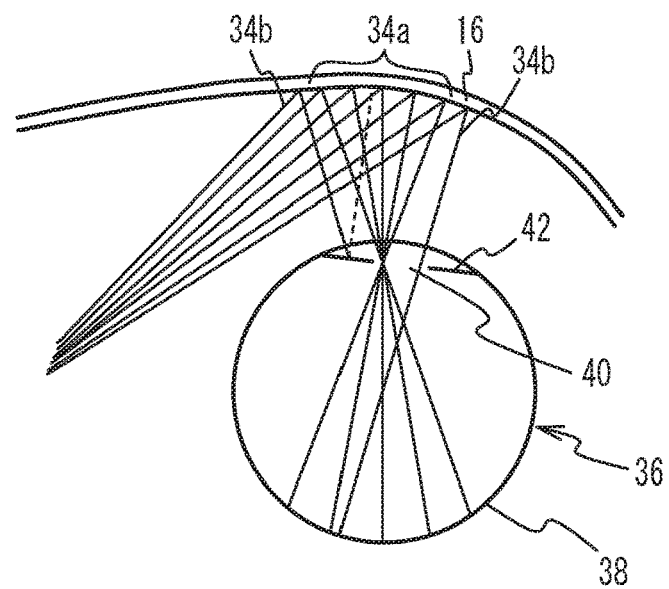
Figure 6C:
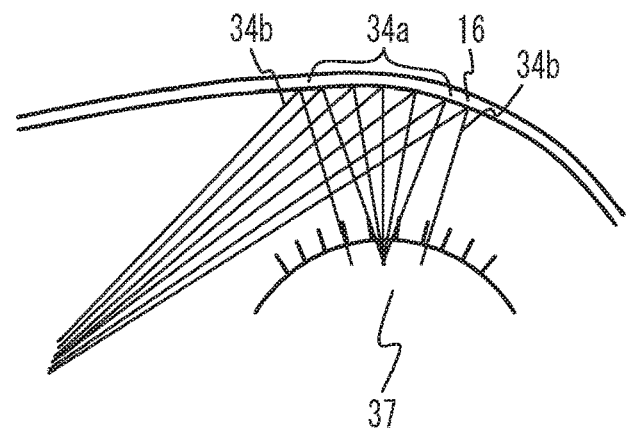

The detection unit 26 detects the direction in which the pupil 40 has moved and the speed of the movement and opening and closing of the eyelid based on detection results by the light detector 18. The detection of the reflected light 46 with use of the light detector 18 will be described with FIG. 6A through FIG. 6C. FIG. 6A through FIG. 6C illustrate the projection portion and an eyeball as viewed from above. FIG. 6A illustrates a case where the image light beam 34a passes through the pupil 40 and all the detection light beams 34b are projected onto the iris 42. FIG. 6B illustrates a case where one or some of the detection light beams 34b pass through the pupil 40 and are not projected onto the iris 42 because of the rotation of the eyeball 36. FIG. 6C illustrates a case where none of the detection light beams 34b is projected onto the iris 42 because of the closing of an eyelid 37.

When the detection light beam 34b is projected onto the iris 42, a relatively large reflected light 46 is generated. On the other hand, when the detection light beam 34b passes through the pupil 40 and is projected onto the retina 38 due to the rotation of the eyeball 36 or when the detection light beam 34b is projected onto the eyelid 37 because of the closing of the eyelid 37, the reflected light 46 is hardly generated. That is, in the case illustrated in FIG. 6A, the light detector 18 detects the relatively large reflected lights 46 for all the detection light beams 34b. On the other hand, in the case illustrated in FIG. 6B, the light detector 18 does not detect the reflected lights 46 of one or some of the detection light beams 34b, and in the case illustrated in FIG. 6C, the light detector 18 detects none of the reflected lights 46 of the detection light beams 34b. That is, when the user has moved the eyeball 36, the light detector 18 does not detect the reflected lights 46 of one or some of the detection light beams 34b. When the user has closed the eyelid 37, the light detector 18 detects none of the reflected lights 46 of the detection light beams 34b.

As described above, the light detector 18 detects the reflected lights 46 that are the detection light beams 34b reflected by the eyeball 36 of the user. The direction from the position irradiated with the image light beam 34a to the position corresponding to the detection light beam 34b of which the reflected light 46 is not detected corresponds to the direction in which the pupil 40 has moved. Thus, the detection unit 26 detects this direction as the direction in which the pupil 40 has moved (i.e., the rotation direction of the eyeball 36). As illustrated in FIG. 4, the detection light beams 34b are projected onto the eyeball 36 while being aligned in the radial direction of the pupil 40. By preliminarily setting the interval between the detection light beams 34b aligned in the radial direction of the pupil 40, the speed of movement of the pupil 40 is obtained based on the time from when the light detector 18 does not detect the reflected light 46 of the detection light beam 34b located at the position closer to the center in the radial direction of the pupil 40 until when the light detector 18 does not detect the reflected light 46 of the detection light beam 34b located at a position located further out. For example, when the pupil 40 moves a distance between the detection light beams 34b over a longer period of time than the oscillation in the vertical vibration (scanning in the vertical direction) by the first mirror 14, it is possible to know the speed of movement of the pupil 40. Thus, the detection unit 26 detects the speed of movement of the pupil 40 based on the detection result by the light detector 18.

Additionally, when the light detector 18 detects none of the reflected lights 46 of the detection light beams 34b, this means that the eyelid 37 of the user is closed. Thus, when the light detector 18 detects none of the reflected lights 46 of the detection light beams 34b, the detection unit 26 detects that the eyelid 37 of the user is closed.

As clear from the above description, the fact where the light detector 18 does not detect the reflected light 46 means that the light detector 18 does not detect the reflected light 46 having an intensity equal to or greater than a predetermined value. That is, when the intensity of the reflected light 46 detected by the light detector 18 is equal to or less than the predetermined value, the detection unit 26 is able to determine that the reflected light 46 is not detected.

Figure 7:
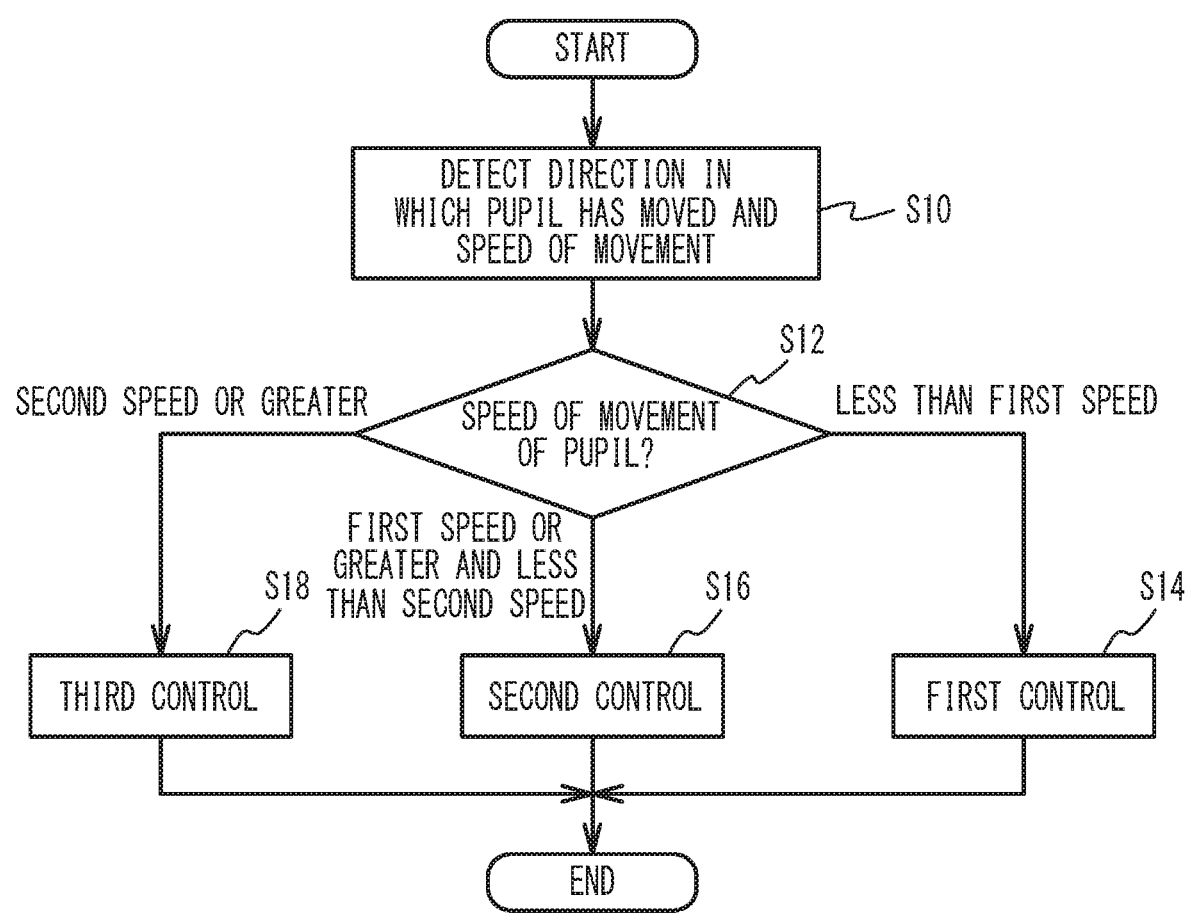
FIG. 7 is a flowchart illustrating operations of a control unit and a detection unit in the first embodiment.

Operations of the control unit 20 and the detection unit 26 in the first embodiment will be described. FIG. 7 is a flowchart illustrating operations of the control unit and the detection unit in the first embodiment. As illustrated in FIG. 7, the detection unit 26 detects the direction in which the pupil 40 has moved and the speed of the movement of the pupil 40 based on the detection of the detection light beams by the light detector 18 (step S10). Here, it is assumed that the detection unit 26 detects a first direction as the direction in which the pupil 40 has moved.

Then, the control unit 20 judges the speed of the movement of the pupil 40 detected by the detection unit 26 (step S12). When the speed of the movement of the pupil 40 is less than a first speed, the control unit 20 performs a first control to the image being projected on the retina 38 of the user (step S14). When the pupil 40 moves at a speed equal to or greater than the first speed and less than a second speed, the control unit 20 performs a second control to the image being projected on the retina 38 of the user (step S16). When the pupil 40 moves at a speed equal to or greater than the second speed, the control unit 20 performs a third control to the image being projected on the retina 38 of the user (step S18).

As described above, in the first embodiment, the projection unit 24 projects the image light beam 34a forming an image onto the pupil 40 of the eyeball 36 of the user to project the image onto the retina 38 of the eyeball 36. As in step S10 in FIG. 7, the detection unit 26 detects the direction in which the pupil 40 of the user has moved and the speed of the movement. As in steps S12 through S18, the control unit 20 performs different controls of the image when the pupil 40 of the user moves at different speeds in the same direction. This control allows the control of the image according to the speed of the pupil 40, thus allowing different controls of the image.

In addition, in the first embodiment, the light detector 18 detects the reflected lights 46 of the detection light beams 34b aligned in the radial direction of the pupil 40 and projected onto the iris 42 of the eyeball 36. The detection unit 26 detects the direction in which the pupil 40 has moved and the speed of the movement of the pupil 40 based on detection results of the reflected lights 46 of the detection light beams 34b by the light detector 18. This operation enables to accurately detect the direction in which the pupil 40 has moved and the speed of the movement, and enables to accurately perform the control of the image according to the intension of the user.

In addition, in the first embodiment, as illustrated in FIG. 4, the detection light beams 34b are projected onto the iris 42 in the form of concentric circles with respect to the pupil 40 to surround the periphery of the pupil 40. This enables to accurately detect the direction in which the pupil 40 has moved and the speed of the movement.

In addition, in the first embodiment, the image light beam 34a and the detection light beams 34b are emitted from the same light source 12. This configuration allows the image light beam 34a and the detection light beams 34b to share an optical system. Thus, the size of the image projection device is reduced.

Figure 8:
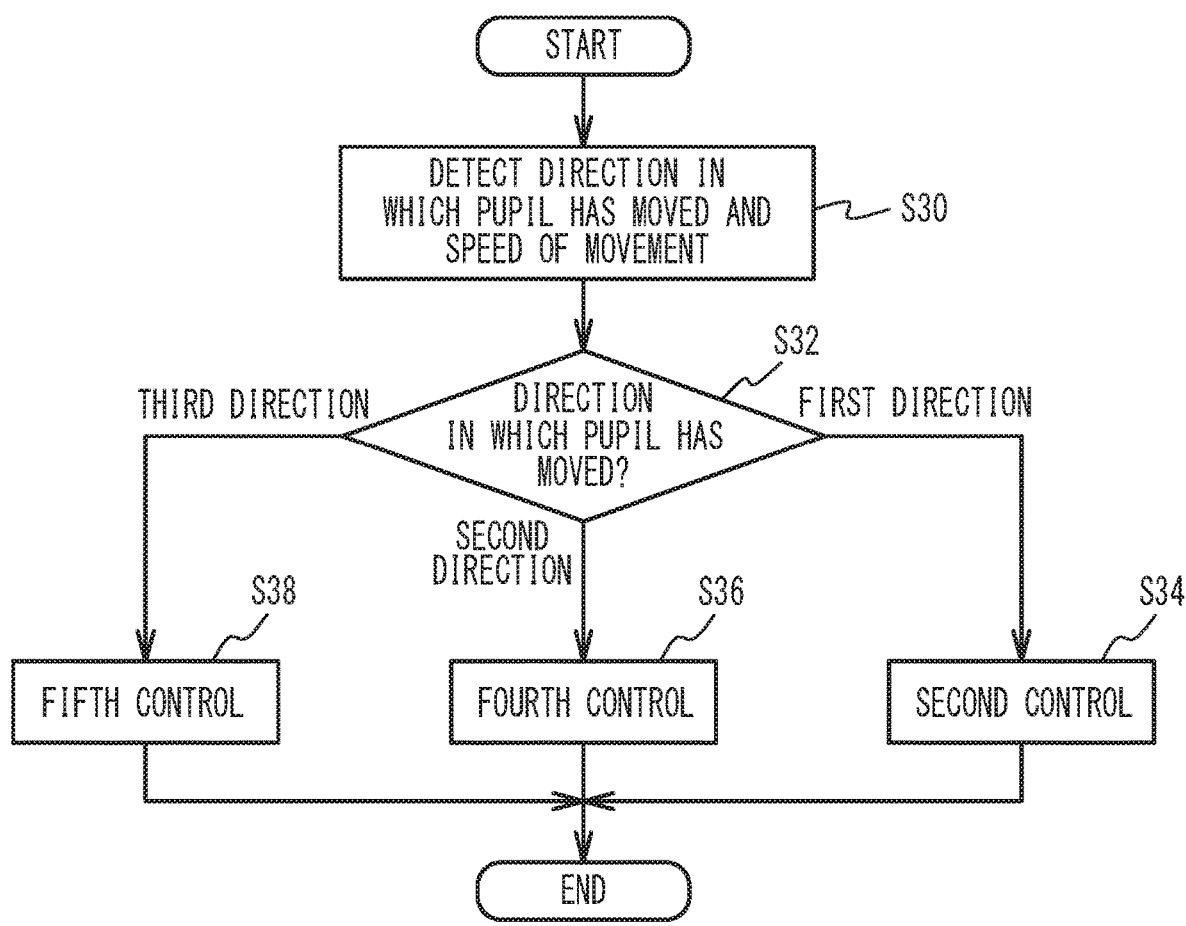
FIG. 8 is a flowchart illustrating operations of the control unit and the detection unit in the first embodiment.

In FIG. 7, a case where different controls are performed when the pupil 40 has moved at different speeds in the same direction has been described. However, different controls may be additionally performed when the pupil 40 has moved in different directions. This will be described with FIG. 8. FIG. 8 is a flowchart illustrating operations of the control unit and the detection unit in the first embodiment. As illustrated in FIG. 8, the detection unit 26 detects the direction in which the pupil 40 has moved and the speed of the movement of the pupil 40 based on the detection of the detection light beams 34b by the light detector 18 (step S30). Here, it is assumed that the speed of the movement of the pupil 40 detected by the detection unit 26 is a first speed.

Then, the control unit 20 judges the direction in which the pupil 40 has moved detected by the detection unit 26 (step S32). When the direction in which the pupil 40 has moved is a first direction, the control unit 20 performs the second control to the image being projected on the retina 38 of the user (step S34). When the direction in which the pupil 40 has moved is a second direction, the control unit 20 performs a fourth control to the image being projected on the retina 38 of the user (step S36). When the direction in which the pupil 40 has moved is a third direction, the control unit 20 performs a fifth control to the image being projected on the retina 38 of the user (step S38).

As described above, the control unit 20 may perform different controls of the image when the pupil 40 has moved in different directions. More different controls of the image become possible by performing different controls when the pupil 40 has moved in different directions described in FIG. 8 in addition to performing of different controls of the image when the pupil 40 has moved at different speeds in the same direction described in FIG. 7. For example, nine different controls of the image are possible by performing different controls of the image when the pupil 40 has moved at three different speeds in the same direction and performing different controls of the image when the pupil 40 has moved at the same speed in three different directions.

In the first embodiment, the first control through the fifth control of the image may include at least one of a control relating to the projection position of the image and a control relating to the content of the image. The control relating to the projection position of the image includes, for example, a control that moves the projection position of the image light beam 34a. The details of this point will be described later. The control relating to the content of the image includes, for example, a control that intentionally changes the image being projected from the current state, such as changing a still image to another still image, stopping or fast-forwarding a moving image, changing an image from a camera to an image from another camera, enlarging or reducing the image, superimposing an icon on an external world image seen through the projection portion, and changing the color or brightness of the image.

For example, when the image of a moving image is being projected, the playback speed or the speed of fast-forward or fast-rewind may be changed in accordance with the speed of the movement of the pupil 40 (the first control through the third control of the image). For example, the reduction factor or the enlargement factor may be changed in accordance with the speed of the movement of the pupil 40. For example, the color or brightness of the image may be changed in accordance with the speed of the movement of the pupil 40.

The first embodiment has described a case where the speed of movement of the pupil 40 is divided into three levels as an example, but the speed of movement of the pupil 40 may be divided into two levels or four or more levels. Similarly, a case where the direction in which the pupil 40 has moved is divided into three directions has been described as an example, but the direction in which the pupil 40 has moved may be divided into two directions or four or more directions.

In the first embodiment, the direction in which the pupil 40 has moved and the speed of the movement are detected based on the reflected lights 46 of the detection light beams 34b emitted from the light source 12 from which the image light beam 34a is also emitted. However, the direction in which the pupil 40 has moved and the speed of the movement may be detected by other methods. For example, the detection light beams 34b may be lights, such as infrared lights, emitted from a light source different from the light source from which the image light beam 34a is emitted.

Second Embodiment

Figure 9:
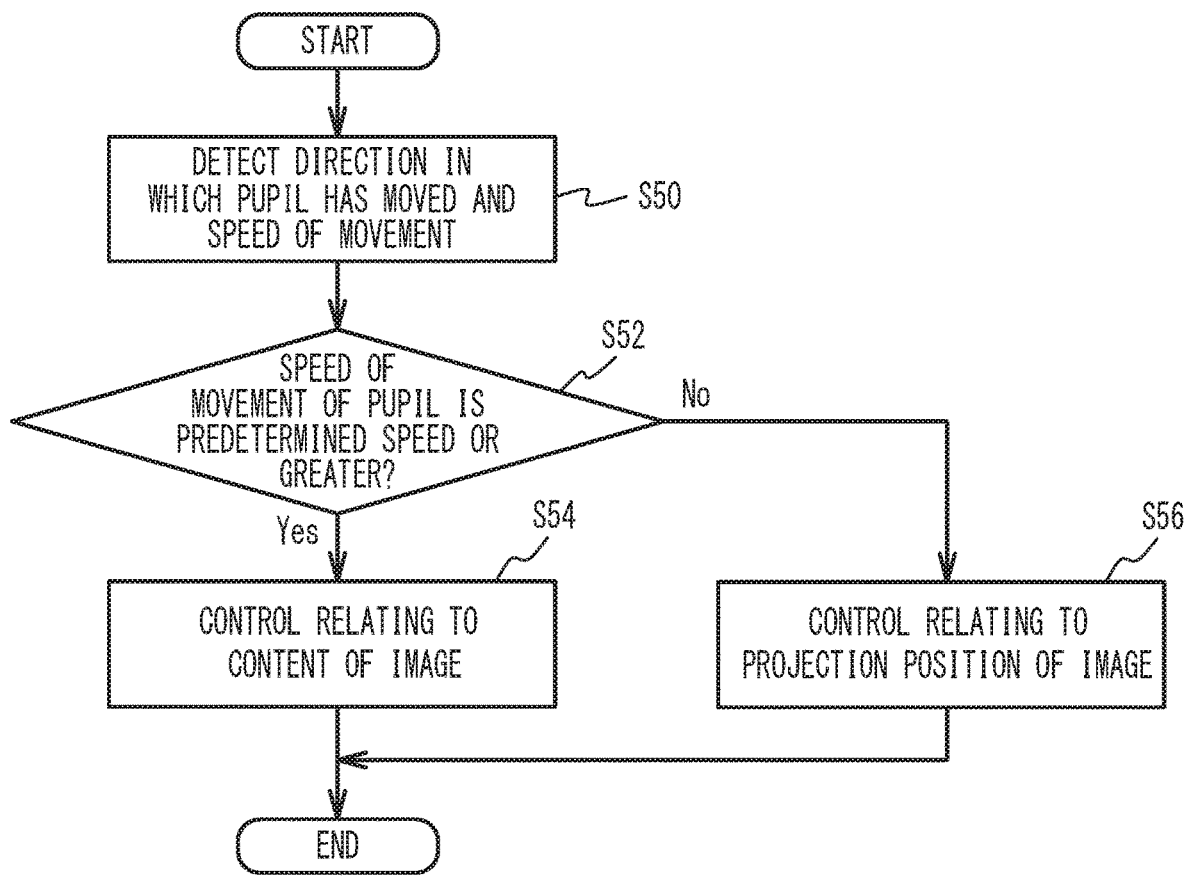
FIG. 9 is a flowchart illustrating operations of the control unit and the detection unit in a second embodiment.
Figure 10A:
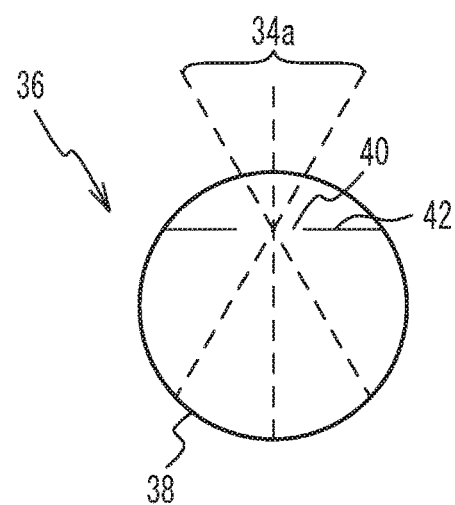
FIG. 10A through FIG. 10C illustrate an eyeball as viewed from above to describe the movement of a pupil and the control of the image light beam in the second embodiment.
Figure 10B:
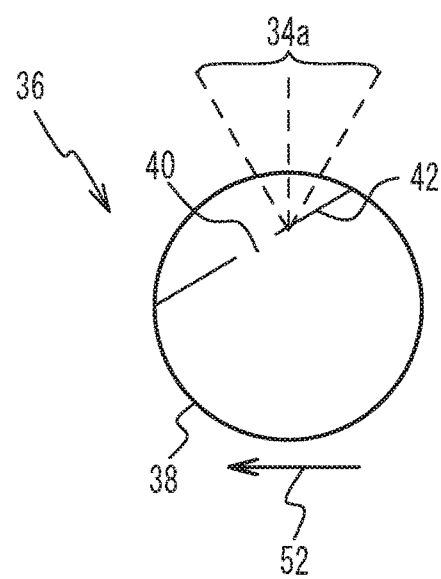
Figure 10C:
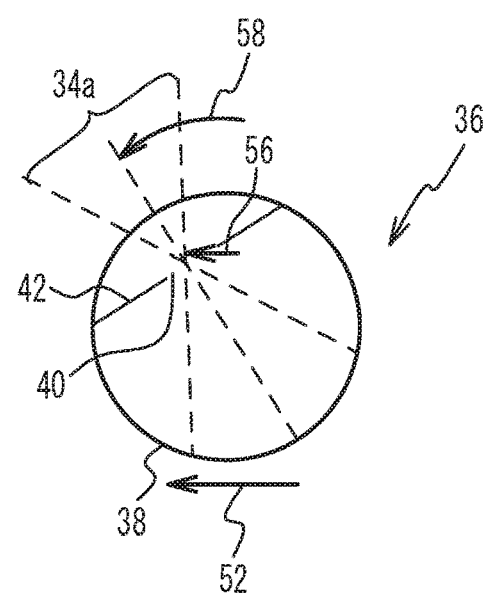
Figure 11:
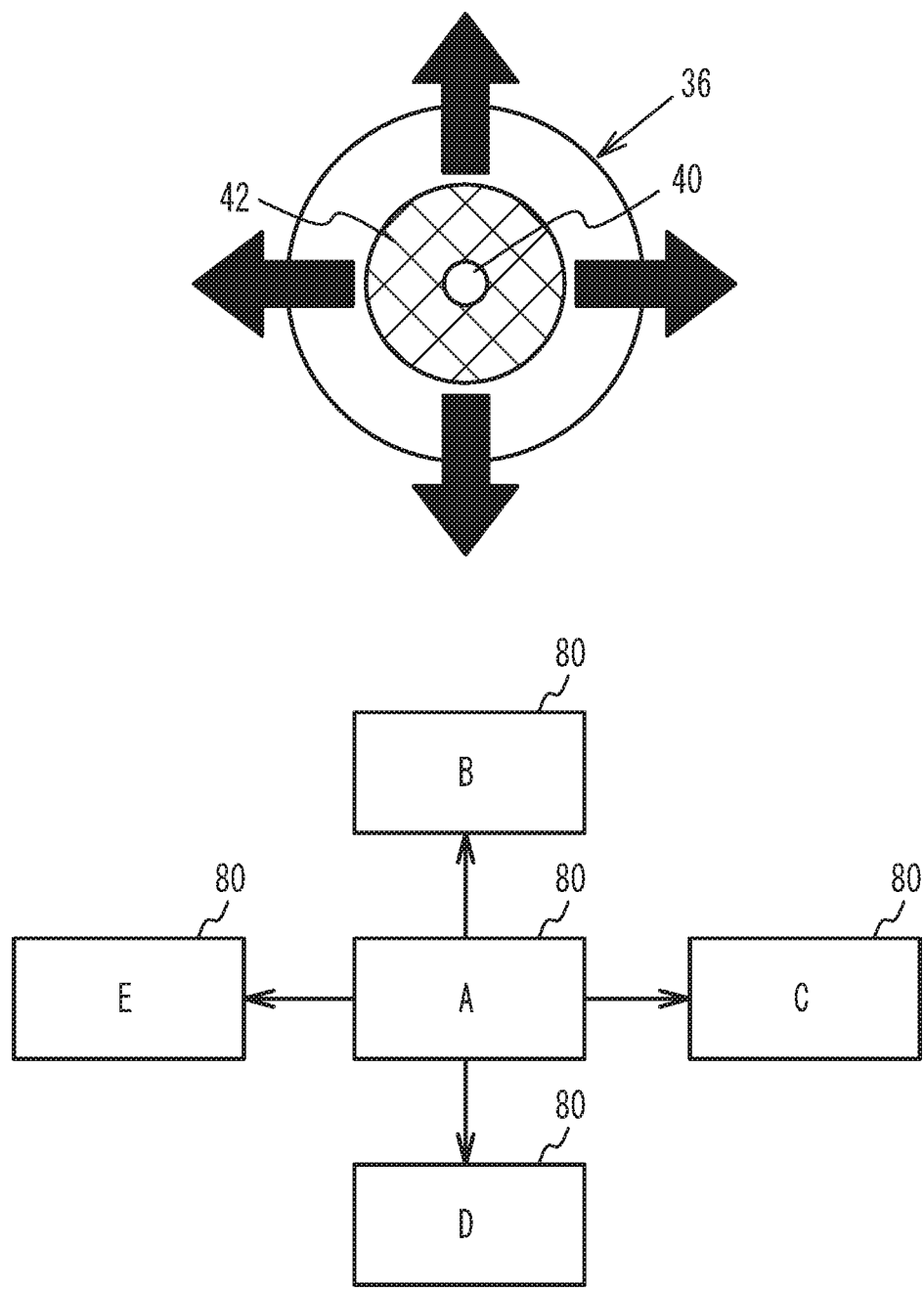
FIG. 11 is a diagram for describing the movement of the pupil and the control of the image in the second embodiment.

An image projection device in accordance with a second embodiment is the same as the image projection device of the first embodiment illustrated in FIG. 1, and the description thereof is thus omitted. FIG. 9 is a flowchart illustrating operations of the control unit and the detection unit in the second embodiment. FIG. 10A through FIG. 10C illustrate an eyeball as viewed from above to describe the movement of the pupil and the control of the image light beam in the second embodiment. FIG. 11 is a diagram for describing the movement of the pupil and the control of the image in the second embodiment.

As illustrated in FIG. 10A, before movement of the pupil 40, the control unit 20 controls the projection unit 24 so that the image light beam 34a converges in the pupil 40 and the image light beam 34a is projected onto the retina 38. The image light beam 34a is incident from substantially the front of the pupil 40 and passes through substantially the center of the pupil 40.

As illustrated in FIG. 9, the detection unit 26 detects the direction in which the pupil 40 has moved and the speed of the movement of the pupil 40 based on the detection of the detection light beams 34b by the light detector 18 (step S50). Then, the control unit 20 determines whether the speed of the movement of the pupil 40 is a predetermined speed or greater (step S52). When the speed of the movement of the pupil 40 is the predetermined speed or greater (step S52: YES), the control unit 20 performs a control relating to the content of the image being projected on the retina 38 by controlling the projection unit 24 (step S54). For example, it is assumed that an image 80 of a still image A has been projected on the retina 38 of the user before movement of the pupil 40 as illustrated in FIG. 11. When the pupil 40 has moved upward at the predetermined speed or greater, the control unit 20 causes the image 80 of a still image B to be projected onto the retina 38 of the user. When the pupil 40 has moved leftward at the predetermined speed or greater, the control unit 20 causes the image 80 of a still image C to be projected onto the retina 38 of the user. When the pupil 40 has moved downward at the predetermined speed or greater, the control unit 20 causes the image 80 of a still image D to be projected onto the retina 38 of the user. When the pupil 40 has moved rightward at the predetermined speed or greater, the control unit 20 causes the image 80 of a still image E to be projected onto the retina 38 of the user.

When the speed of the movement of the pupil 40 is less than the predetermined speed, it is considered that the user did not intend to control the content of the image and moved the eye for other reasons. Since the image projection device 100 is fixed to the head and/or face of the user, when the movement of the pupil 40 is detected, this means that the pupil 40 has moved relative to the head and/or face of the user. Thus, when the pupil 40 has moved leftward 52 as illustrated in FIG. 10B, at least a part of the image light beam 34a is projected onto the iris 42, and the at least a part of the image light beam 34a is not projected onto the retina 38.

As illustrated in FIG. 9, when the speed of the movement of the pupil 40 is less than the predetermined speed (step S52: No), the control unit 20 performs a control relating to the projection position of the image so that the image is projected onto the retina 38 (step S56). For example, the control unit 20 controls the projection unit 24 so that the image light beam 34a is projected onto the pupil 40. As illustrated in FIG. 10C, the control unit 20 moves the projection position of the image light beam 34a in the leftward direction 52 in which the pupil 40 has moved as indicated by an arrow 56. This control causes the image light beam 34a to pass through substantially the center of the pupil 40. Furthermore, the control unit 20 tilts the irradiation direction of the image light beam 34a in the leftward direction in which the pupil 40 has moved as indicated by an arrow 58. This control causes the image light beam 34a to be incident from substantially the front of the pupil 40. Thus, the user is able to visually recognize an image identical to the image before the movement of the pupil 40. That is, in the case of FIG. 11, the user is able to keep seeing the image 80 of the still image A.

Here, a tangible example of step S56 in FIG. 9 will be described. As described above, the control unit 20 drives the position adjustment unit 22 to move the position of the first mirror 14 and move the positions of the third mirror 17 and the fourth mirror 44 in conjunction with the move of the first mirror 14 based on a detection result by the detection unit 26. This control allows the origin of the scanning of the image light beam 34a to be moved. As the origin of the scanning of the image light beam 34a is moved, the projection positions of the image light beam 34a and the detection light beams 34b onto the eyeball 36 are moved. This will be described with use of FIG. 12A through FIG. 13.

Figure 12A:
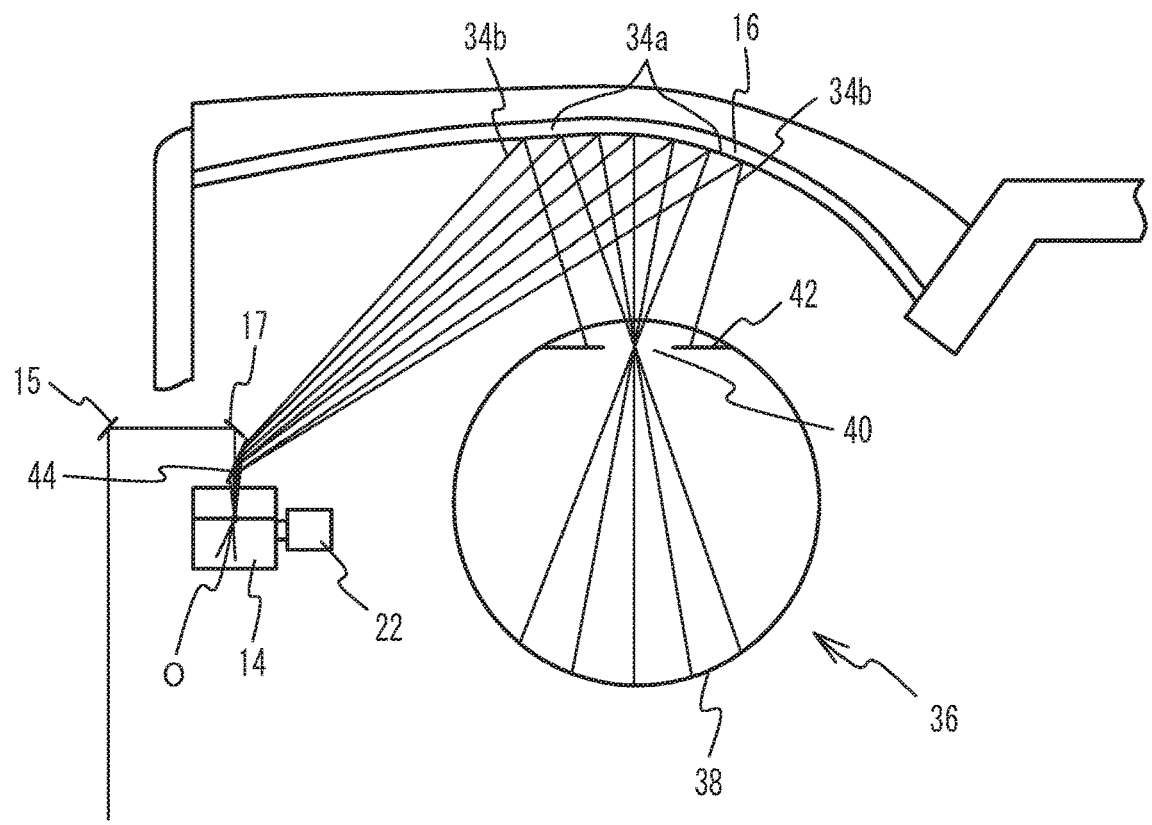
FIG. 12A and FIG. 12B are diagrams for describing change of projection positions of the image light beam and detection light beams onto an eyeball.
Figure 12B:
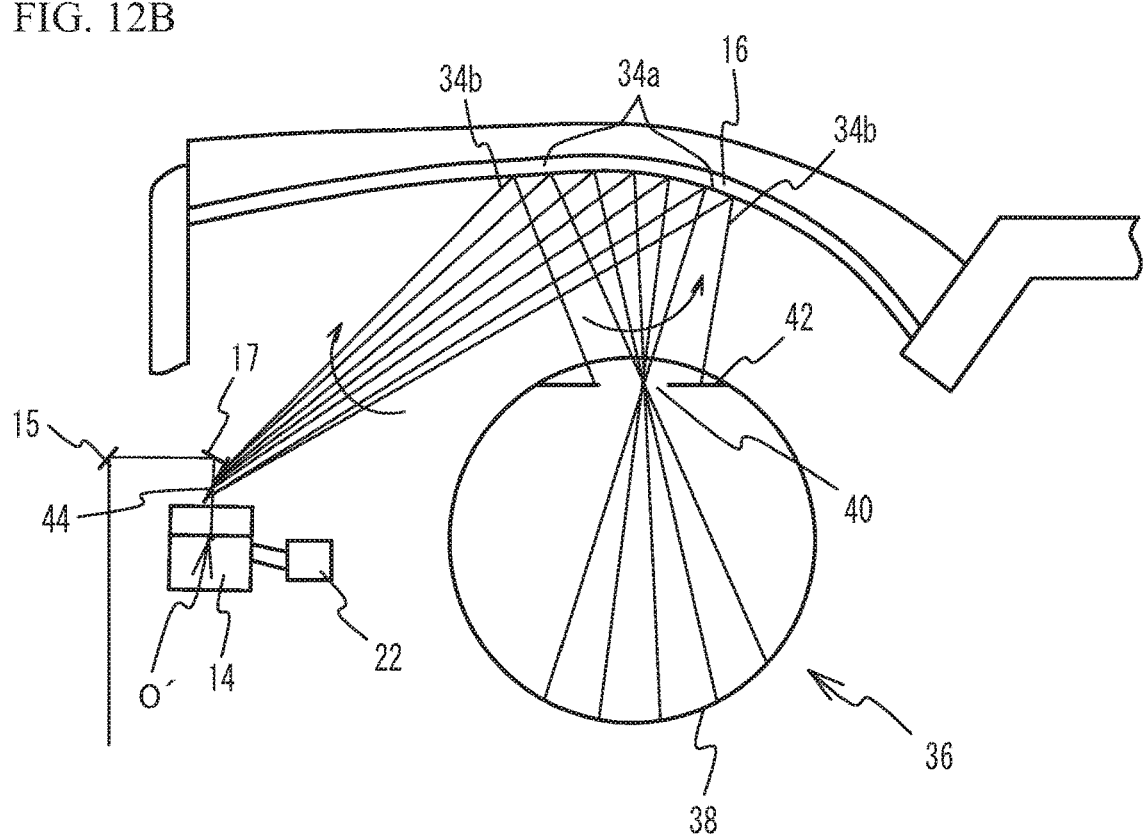
Figure 13:
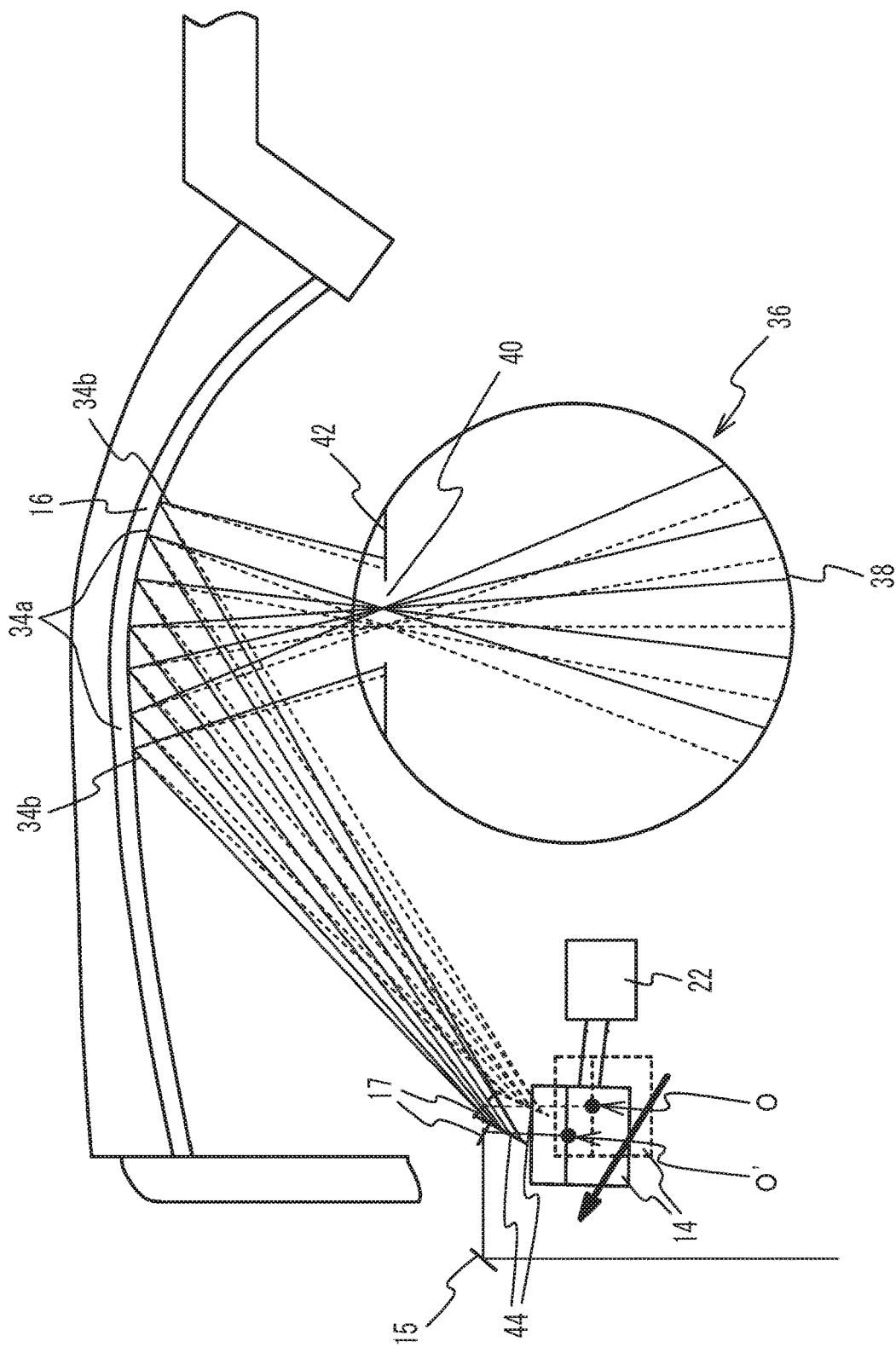
FIG. 13 is a diagram for describing change of projection positions of the image light beam and the detection light beams onto an eyeball.

FIG. 12A through FIG. 13 are diagrams for describing change of projection positions of the image light beam and the detection light beams onto an eyeball. FIG. 13 illustrates the state combining the state of FIG. 12A and the state of FIG. 12B, indicates the state of FIG. 12A by dotted lines, and indicates the state of FIG. 12B by solid lines.

The solid lines in FIG. 12A and the dotted lines in FIG. 13 indicate the case where the image light beam 34a passes through the vicinity of the center of the pupil 40. When the position adjustment unit 22 is driven to move the position of the first mirror 14 and move the positions of the third mirror 17 and the fourth mirror 44 in conjunction with the move of the first mirror 14 as indicated by the solid lines in FIG. 12B and FIG. 13 from the state indicated by the dotted lines in FIG. 10A and FIG. 11, the origin of the scanning of the image light beam 34a is moved from O to O'. Even when the origin of the scanning moves, the incident position of the image light beam 34a corresponding to the center part of the image projected onto the retina 38 into the projection portion 16 is configured to be hardly changed. This is to reduce the deterioration of the quality of the image projected onto the retina 38 and the change of the incident position of the detection light beam 34b to the projection portion 16.

The move of the origin of the scanning of the image light beam 34a described above changes the incident angles of the image light beam 34a and the detection light beam 34b to the projection portion 16, resulting in the move of the projection positions of the image light beam 34a and the detection light beam 34b onto the eyeball 36. The image light beam 34a and the detection light beam 34b move in conjunction with each other while the relative positional relation between the projection positions onto the eyeball 36 remains fixed. For example, the state where the image light beam 34a passes through the vicinity of the center of the pupil 40 as indicated by the solid lines in FIG. 12A and the dotted lines in FIG. 13 changes to the state where the image light beam 34a passes through a part closer to the edge than the center of the pupil 40 as indicated by the solid lines in FIG. 12B and FIG. 13. As described above, the projection positions of the image light beam 34a and the detection light beam 34b onto the eyeball 36 can be moved in conjunction with each other by moving the origin of the scanning of the image light beam 34a by causing the position adjustment unit 22 to move the position of the first mirror 14 and to move the positions of the third mirror 17 and the fourth mirror 44 in conjunction with the move of the first mirror 14. The first mirror 14 preferably moves in arc, but may linearly move in the direction indicated by an arrow in FIG. 13 or the direction perpendicular to the plane of paper in FIG. 13 (the direction perpendicular to the arrow). In this case, a dual-axis actuator (e.g., an ultrasonic actuator) capable of biaxially moving may be used as the position adjustment unit 22.

As described above, in the second embodiment, the control unit 20 performs a control relating to the projection position of the image being projected on the retina 38 when the speed of movement of the pupil 40 is less than a predetermined speed. For example, the control unit 20 moves the projection position of the image light beam 34a so that the image 80 of the still image A being projected on the retina 38 continues to be projected. Additionally, when the speed of movement of the pupil 40 is the predetermined speed or greater, the control unit 20 performs a control relating to the content of the image. For example, the control unit 20 changes the image 80 of the still image A being projected on the retina 38 to the images 80 of the still images B through E. This control allows the user to control the content of the image (for example, change the image) by moving the eye fast, and allows the user to visually recognize the image identical to the image before the movement of the eye when the user moved the eye without indenting the control relating to the content of the image.

The second embodiment has described a case where the image 80 of a still image is being projected on the retina 38 of the user, but does not intend to suggest any limitation. For example, the image of a moving image may be projected. In this case, for example, when the pupil 40 moves rightward at a predetermined speed or greater, fast-forward of the moving image may be performed, and when the pupil 40 moves leftward at the predetermined speed or greater, fast-rewind of the moving image may be performed. When the pupil 40 moves upward at the predetermined speed or greater, the moving image may be temporarily stopped, and when the pupil 40 moves downward at the predetermined speed or greater, the moving image may be stopped. For example, an image from a camera may be projected. In this case, for example, when the pupil 40 moves rightward at the predetermined speed or greater during the projection of the image from a camera shooting the front of the user, the image may be changed to an image from a camera shooting the rear of the user.

The second embodiment has described a case where different controls of the content of the image are performed when the pupil 40 moves upward, downward, rightward, or leftward, but different controls of the content of the image may be performed when the pupil 40 moves in several directions other than four directions: upward, downward, rightward, and leftward.

In the second embodiment, in the control relating to the projection position of the image at step S56 in FIG. 9, the movement distance of the projection position of the image light beam 34a may be made to be less than the movement distance of the pupil 40. Such a control is achieved by storing a table (see FIG. 14) defining the movement direction and the movement distance of the image light beam 34a with respect to each of the detection light beams 34b in the control unit 20 in advance, and moving the projection position of the image light beam 34a in accordance with the movement direction and the movement distance obtained from the detection light beam 34b not detected by the light detector 18 and the above table. This allows the user to easily recognize, for example, letters written in the edge of the still image. Even when the movement distance of the projection position of the image light beam 34a is not made to be less, the table illustrated in FIG. 14 may be prepared in advance, and the projection position of the image light beam 34a may be moved with use of this table.

Third Embodiment

Figure 15:
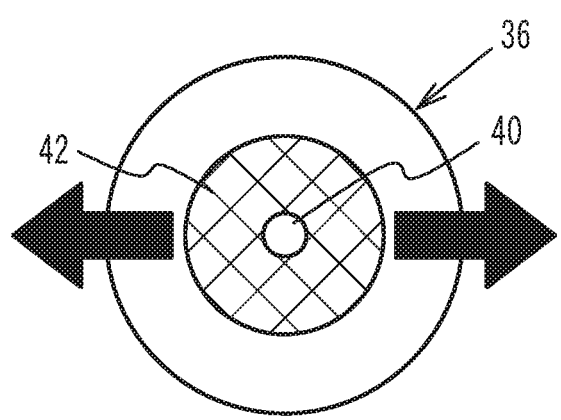
FIG. 15 is a diagram for describing the movement of the pupil and the control of the image in a third embodiment.
Figure 15:
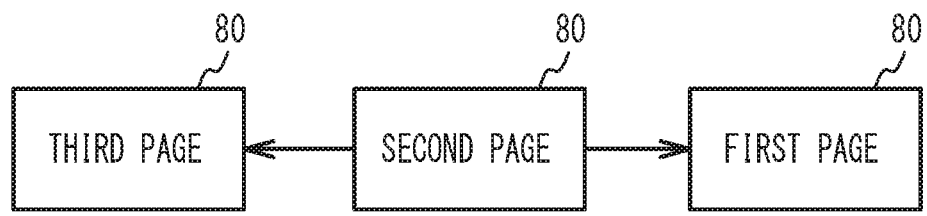

A third embodiment describes a case where an image projected onto the retina 38 of the user is an image corresponding to a page of a digital book. An image projection device in accordance with the third embodiment is the same as the image projection device of the first embodiment illustrated in FIG. 1, and the description thereof is thus omitted. The flowchart illustrating operations of the control unit and the detection unit in the third embodiment is the same as the flowchart of the second embodiment illustrated in FIG. 9, and the description thereof is thus omitted. FIG. 15 is a diagram for describing the movement of the pupil and the control of the image in the third embodiment. FIG. 15 illustrates the control at step S54 in FIG. 9.

As illustrated in FIG. 15, it is assumed that the image 80 of the second page of a digital book has been projected on the retina 38 of the user before movement of the pupil 40. When the pupil 40 has moved rightward at a predetermined speed or greater, the control unit 20 changes the image to the image 80 of the third page of the digital book. When the pupil 40 has moved leftward at the predetermined speed or greater, the control unit 20 changes the image to the image 80 of the first page.

As described above, in the third embodiment, the image projected onto the retina 38 of the user is an image corresponding to a page of a digital book. The control unit 20 turns a page of the digital book when the pupil 40 has moved in the right-and-left direction at a predetermined speed or greater. This configuration enables the user to turn a page of a digital book by moving the eye fast.

Fourth Embodiment

Figure 16:
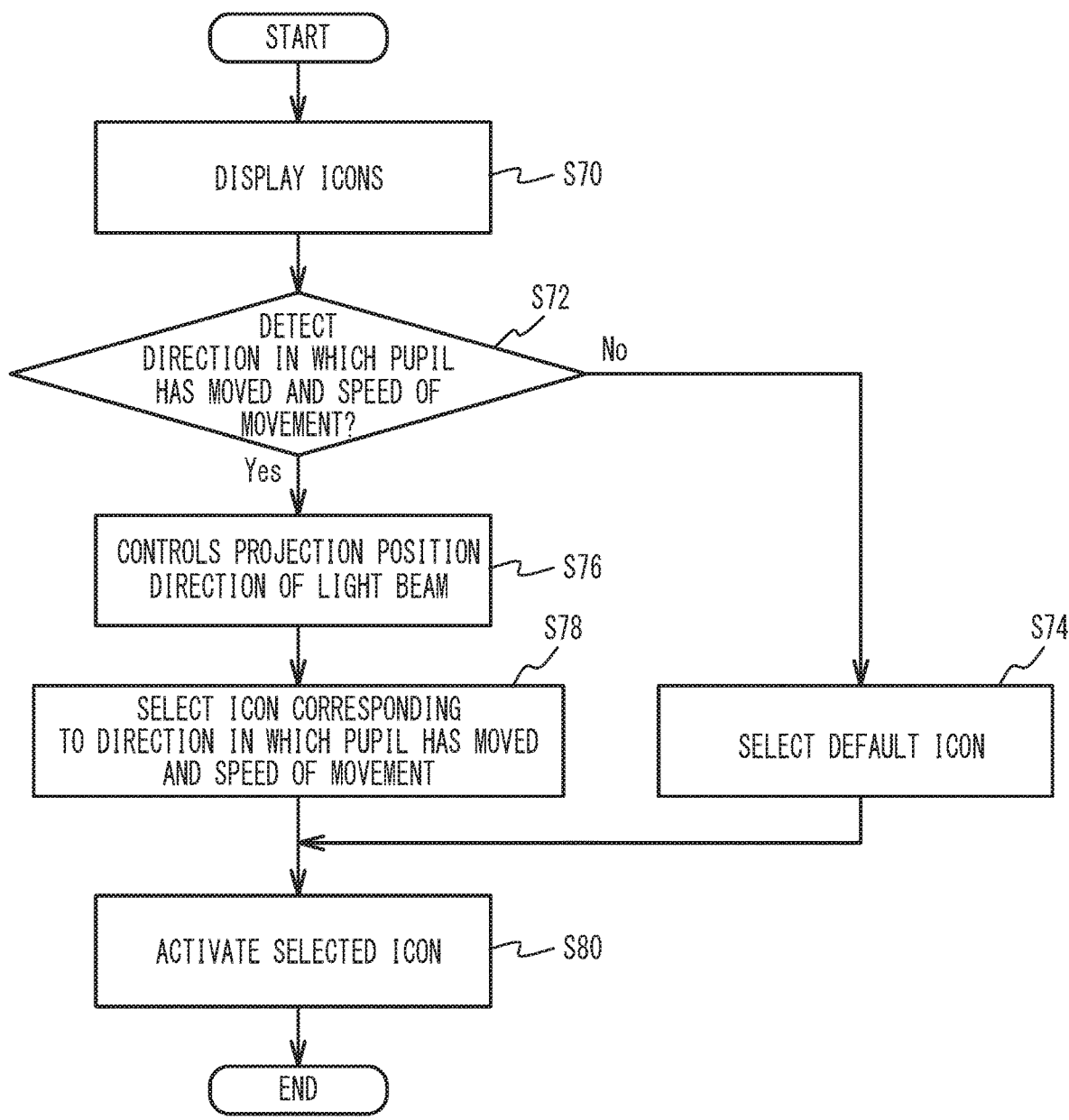
FIG. 16 is a flowchart illustrating operations of the control unit and the detection unit in a fourth embodiment.
Figure 17:
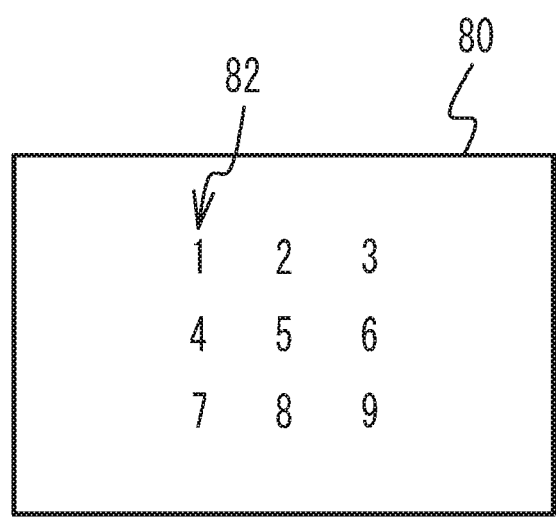
FIG. 17 illustrates an image that is projected onto the retina of the user in the fourth embodiment.

An image projection device of a fourth embodiment is the same as the image projection device of the first embodiment illustrated in FIG. 1, and the description thereof is thus omitted. FIG. 16 is a flowchart illustrating operations of the control unit and the detection unit in the fourth embodiment. FIG. 17 illustrates an image that is projected onto the retina of the user in the fourth embodiment. As illustrated in FIG. 16, the control unit 20 projects an image including icons onto the retina 38 of the user, for example, at the time of starting the image projection device or in response to the instruction by the user (step S70). For example, as illustrated in FIG. 17, the control unit 20 projects the image 80 in which first through ninth icons 82 are arranged in three rows and three columns onto the retina 38 of the user.

Then, the control unit 20 determines whether the detection unit 26 has detected the direction in which the pupil 40 has moved and the speed of the movement (step S72). The detection unit 26 detects the direction in which the pupil 40 has moved and the speed of the movement of the pupil 40 based on the detection of the detection light beams 34b by the light detector 18. When the movement of the pupil 40 is not detected (step S72: No), the control unit 20 selects a default icon among the icons (step S74). For example, when the default icon is the first icon 82 in FIG. 17, the control unit 20 selects the first icon 82. The control unit 20 may change the color of the icon, blink the icon, or circle the icon so that the user is able to recognize the selected icon.

When movement of the pupil 40 has been detected (step S72: Yes), the control unit 20 controls the projection unit 24 so that the image light beam 34a is projected onto the pupil 40 (step S76). Step S76 is executed by the same method as step S56 in FIG. 9 of the third embodiment. This enables the user to visually recognize an image identical to the image before the movement of the pupil 40.

Then, the control unit 20 selects the icon corresponding to the direction in which the pupil 40 has moved and the speed of the movement (step S78). For example, in FIG. 17, the control unit 20 selects the second icon when the pupil 40 has moved leftward, and selects the third icon when the pupil 40 has moved leftward at a predetermined speed or greater. The control unit 20 selects the fourth icon when the pupil 40 has moved upward, and selects the seventh icon when the pupil 40 has moved upward at the predetermined speed or greater. The control unit 20 selects the fifth icon when the pupil 40 has moved to the upper left, and selects the ninth icon when the pupil 40 has moved to the upper left at a predetermined speed or greater. The control unit 20 selects the sixth icon when the pupil 40 has moved leftward at a predetermined speed or greater and then moved upward, and selects the eighth icon when the pupil 40 has moved upward at the predetermined speed or greater and then moved leftward.

Then, the control unit 20 starts the selected icon based on the instruction from the user (step S80). For example, when the closing of the eyelid 37 of the user for a predetermined period of time or greater is detected by the detection unit 26, the control unit 20 starts the selected icon.

As described above, in the fourth embodiment, as illustrated in FIG. 17, the image projected onto the retina 38 of the user is the image 80 including the icons 82. The control unit 20 selects one icon from the icons 82 in accordance with the direction in which the pupil 40 has moved and the speed of the movement as at step S78 in FIG. 16. This enables the user to select one icon from a plurality of icons by changing the movement direction of the eye and the movement speed.

The fourth embodiment has described a case where the icon that has been present in the direction opposite to the direction in which the pupil 40 has moved is selected at step S78 in FIG. 16 as an example, but the icon that has been present in the direction identical to the direction in which the pupil 40 has moved may be selected.

In the third and fourth embodiments, when the light detector 18 does not detect two or more detection light beams 34 of the detection light beams 34b, the middle position between the detection light beams 34b that are not detected may be obtained, and the projection position of the image light beam 34a may be moved to the middle position.

The first through fourth embodiments have described a spectacle type HMD as an example of the image projection device, but the image projection device may be an image projection device other than the HMD. An example in which an image is projected onto the retina 38 of one of the eyeballs 36 has been described, but the image may be projected onto the retinas 38 of both eyeballs 36. A scan mirror has been described as an example of the scan unit, but the scan unit may be any component that is able to scan a light beam. For example, other components, such as potassium tantalate niobate (KTN) crystals that are electro-optic materials, may be used as the scan unit. A laser light has been described as an example of the light beam, but the light beam may be a light other than laser light.

Although the embodiments of the present invention has been described in detail, the present invention is not limited to a certain embodiment, and it should be understood that the various change, substitutions, and alterations could be made hereto without departing from the scope of the invention.

The invention claimed is:

1. An image projection device comprising:
a projection unit that includes a light source emitting an image light beam forming an image and a detection light beam, projects the image light beam and the detection light beam onto different areas of an eyeball of a user, and projects the image onto a retina of the eyeball by projecting the image light beam onto a pupil of the eyeball;
a light detector that detects reflected light that the detection light beam is reflected by the eyeball,
a detection unit that detects a direction in which the pupil has moved relative to a face of the user and a speed of movement of the pupil based on detection results of the reflected light detected by the light detector; and
a control unit that performs different controls of the image when the pupil has moved at different speeds in a same direction based on the direction in which the pupil has moved and the speed of movement of the pupil that are detected by the detection unit,
wherein
the light source emits the detection light beam at a time when the light source does not emit the image light beam,
the light detector that detects the reflected lights—that the detection light beams projected onto an iris of the eyeball are reflected by the iris, and
the projection unit projects the detection light beams onto the iris so that a plurality of sets, each formed by two or more detection light beams aligned in a radial direction of the pupil among the detection light beams, is located between a portion on the pupil side of the iris and an outer portion of the iris.

2. The image projection device according to claim 1, wherein
the control unit performs a first control of the image when it is determined that the speed of movement of the pupil is less than a predetermined speed, and performs a second control of the image when the speed of movement of the pupil is the predetermined speed or greater.

3. The image projection device according to claim 1, wherein
the controls of the image include at least one of a control relating to a projection position of the image and a control relating to a content of the image.

4. The image projection device according to claim 1, wherein
the control unit performs a control relating to a projection position of the image when the speed of movement of the pupil is less than a predetermined speed, and performs a control relating to a content of the image when the speed of movement of the pupil is the predetermined speed or greater.

5. The image projection device according to claim 4, wherein
the image projected onto the retina includes a first image and a second image different from the first image, and
the control unit moves a projection position of the image light beam so that the first image being projected on the retina continues to be projected when the speed of movement of the pupil is less than the predetermined speed, and changes the first image being projected on the retina to the second image when the speed of movement of the pupil is the predetermined speed or greater.

6. The image projection device according to claim 4, wherein
the image projected onto the retina is an image corresponding to a page of a digital book, and
the control unit turns the page of the digital book when a speed of movement of the pupil in a right-and-left direction is the predetermined speed or greater.

7. The image projection device according to claim 1, wherein
the image projected onto the retina is an image including a plurality of icons, and
the control unit selects from the plurality of icons an icon corresponding to the direction in which the pupil has moved and the speed of movement of the pupil.

8. The image projection device according to claim 1, wherein
the control unit performs different controls of the image when the pupil has moved in different directions.

9. The image projection device according to claim 1, wherein
the detection light beams are projected onto the iris in a form of concentric circles with respect to the pupil.

10. The image projection device according to claim 1, wherein
the light source emitting the detection light beams and the image light beam is a single light source.

11. The image projection device according to claim 1, wherein
the projection unit includes a single scanning mirror that scans the image light beam and reflects the detection light beam, and
the detection light beam is reflected by the scanning mirror when the image light beam is not scanned by the scanning mirror.

12. An image projection device comprising:
a projection unit that projects an image light beam forming an image onto a pupil of an eyeball of a user and detection light beams onto an iris of the eyeball of the user when the image light beam is projected onto the pupil, and projects the image onto a retina of the eyeball by the image light beam projected onto the pupil;
a light detector that detects reflected lights that the detection light beams are reflected by the eyeball of the user;
a detection unit that detects a direction in which the pupil has moved and a speed of movement of the pupil based on detection results of the reflected lights that are detected by the light detector; and
a control unit that performs different controls of the image based on the direction in which the pupil has moved and the speed of movement of the pupil that are detected by the detection unit,
wherein the projection unit projects the detection light beams onto the iris so that a plurality of sets, each formed by two or more detection light beams aligned in a radial direction of the pupil among the detection light beams, is located between a portion on the pupil side of the iris and an outer portion of the iris.

13. The image projection device according to claim 12, wherein the projection unit projects the detection light beams onto the iris so that two sets among the plurality of sets are located on both sides of the pupil in a direction of movement to a left and right of the eyeball.

14. The image projection device according to claim 12, wherein the projection unit projects the detection light beam onto the iris so that two sets among the plurality of sets are located on both sides of the pupil in a direction of movement to left and right of the eyeball and other two sets among the plurality of sets are located on both sides of the pupil in a direction of movement to up and down of the eyeball.

\* \* \* \* \*